United States Patent [19]
Hatt

[11] 3,921,914
[45] Nov. 25, 1975

[54] PLANT FEEDER
[76] Inventor: Raymond J. Hatt, P.O. Box 503, Amherst, Mass. 01002
[22] Filed: Sept. 3, 1974
[21] Appl. No.: 502,543

[52] U.S. Cl. ................................................. 239/567
[51] Int. Cl.² ............................................ B05B 1/18
[58] Field of Search ...... 239/271, 272, DIG. 1, 559, 239/567, 276

[56] References Cited
UNITED STATES PATENTS
| | | | |
|---|---|---|---|
| 648,263 | 4/1900 | Hull | 239/567 |
| 2,909,328 | 10/1959 | Babyak | 239/276 X |
| 3,322,347 | 5/1967 | Pierce | 239/559 |
| 3,357,476 | 12/1967 | Tofflemire | 239/567 |

*Primary Examiner*—Lloyd L. King
*Attorney, Agent, or Firm*—Norman S. Blodgett; Gerry A. Blodgett

[57] ABSTRACT

Plant feeder consisting of a main conduit joined to a plurality of annular perforated elements, each of which lies around the base of a plant.

8 Claims, 5 Drawing Figures

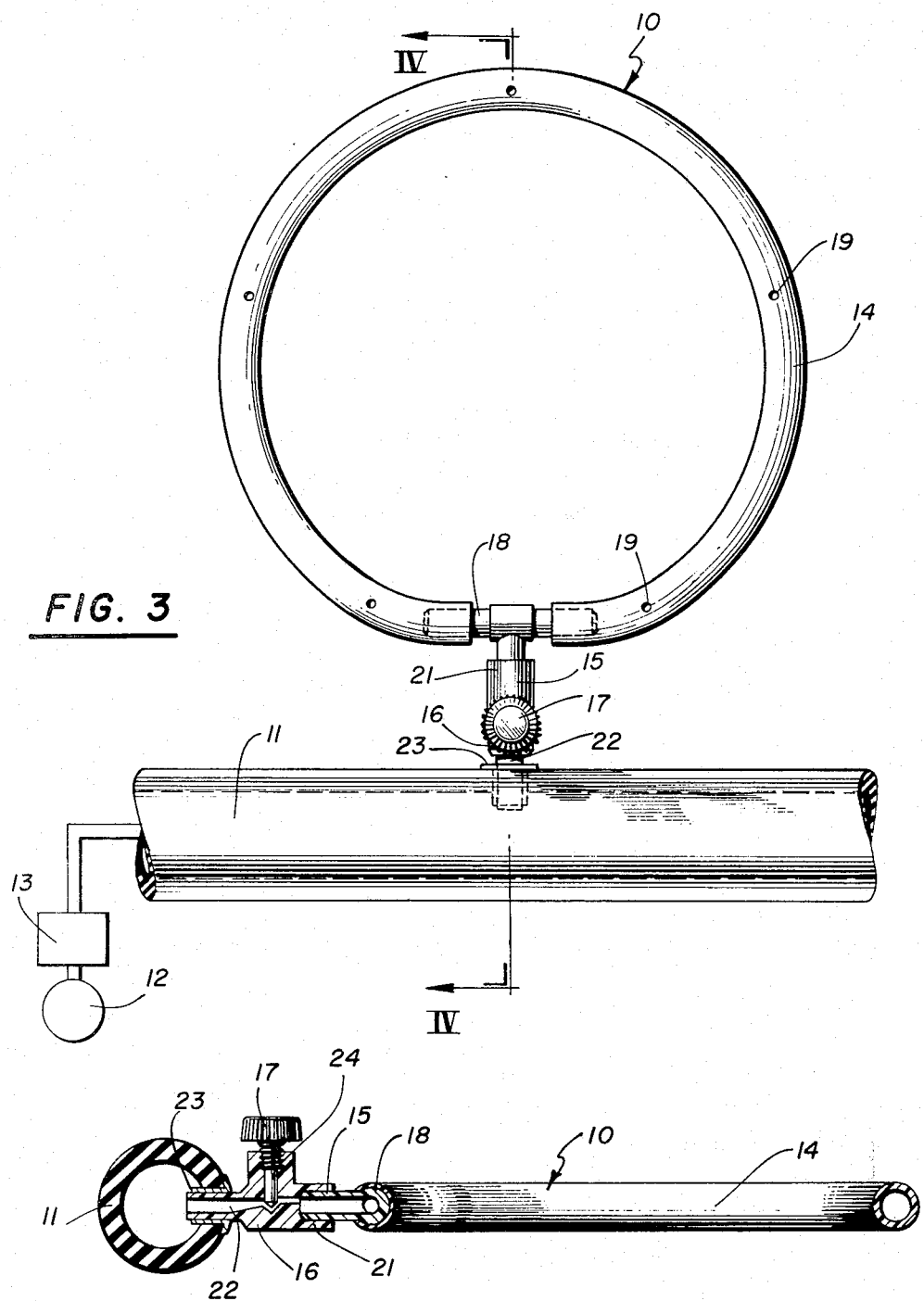

PLANT FEEDER

BACKGROUND OF THE INVENTION

In the growing of plants and, particularly, small trees the growth of the plant can be accelerated and the character of the tree improved by proper feeding. Such feeding may consist of suitable provision of water when natural water is not available, or the introduction of water-carried nutrients to the root system of the plant. While it is possible to feed the plant by the use of human labor, in a large nursery, truckfarm, orchard, or home garden this becomes very expensive. Provisions have been made in the past for sprinkling systems extending throughout an argicultural layout, but not only is this a very expensive type of equipment, but the water is largely wasted, since only a small portion of it is applied directly at the roots of the plants. Attempts have been made to feed the roots of the plants directly by the use of perforated stakes, but such systems have been not only expensive and complex, but they have been subject to rapid deterioration, due to being exposed to the weather, and they have been time-consuming to operate and maintain. These and other difficulties experienced with the prior art devices have been obviated in a novel manner by the present invention.

It is, therefore, an outstanding object of the invention to provide a plant feeder capable of feeding a large number of plants efficiently and without loss of water or nutrient.

Another object of this invention is the provision of a plant feeder system whose parts are relatively inexpensive and which may be assembled with a minimum skill or difficulty.

A further object of the present invention is the provision of a plant feeder whose elements and assembly are not subject to deterioration due to exposure to the weather.

It is another object of the instant invention to provide a plant feeder for individual feeding of a plurality of plants including provision for adjusting the rate of feed to individual plants.

Another object of this invention is the provision of a plant feeder which may be dis-assembled, in case of clogging, for cleaning purposes with a minimum of effort.

A further object of the present invention is the provision of a plant feeder that feeds the root systems of the plant or trees in 360° with the assistance of the capillary action of the soil.

With these and other objects in view, as will be apparent to those skilled in the art, the invention resides in the combination of parts set forth in the specification and covered by the claims appended hereto.

SUMMARY OF THE INVENTION

In general, the invention consists of a plant feeder having a main conduit, having a tubular annular element with small apertures formed therein, and having a connector joining the main conduit to the element.

More specifically, the annular element is formed as a length of flexible plastic tube formed into an annulus with the ends joined by a smaller plastic fitting. The connector includes a plastic valve having a threaded element for adjusting the flow of fluid from the main conduit to the annular element.

BRIEF DESCRIPTION OF THE DRAWINGS

The character of the invention, however, may be best understood by reference to one of its structural forms, as illustrated by the accompanying drawings, in which:

FIG. 3 is a plan view somewhat enlarged of a portion of the plant feeder, FIG. 4 is a vertical sectional view of the feeder taken on the line IV—IV of FIG. 3.

DESCRIPTION OF THE PREFERRED EMBODIMENT

Figure 1:
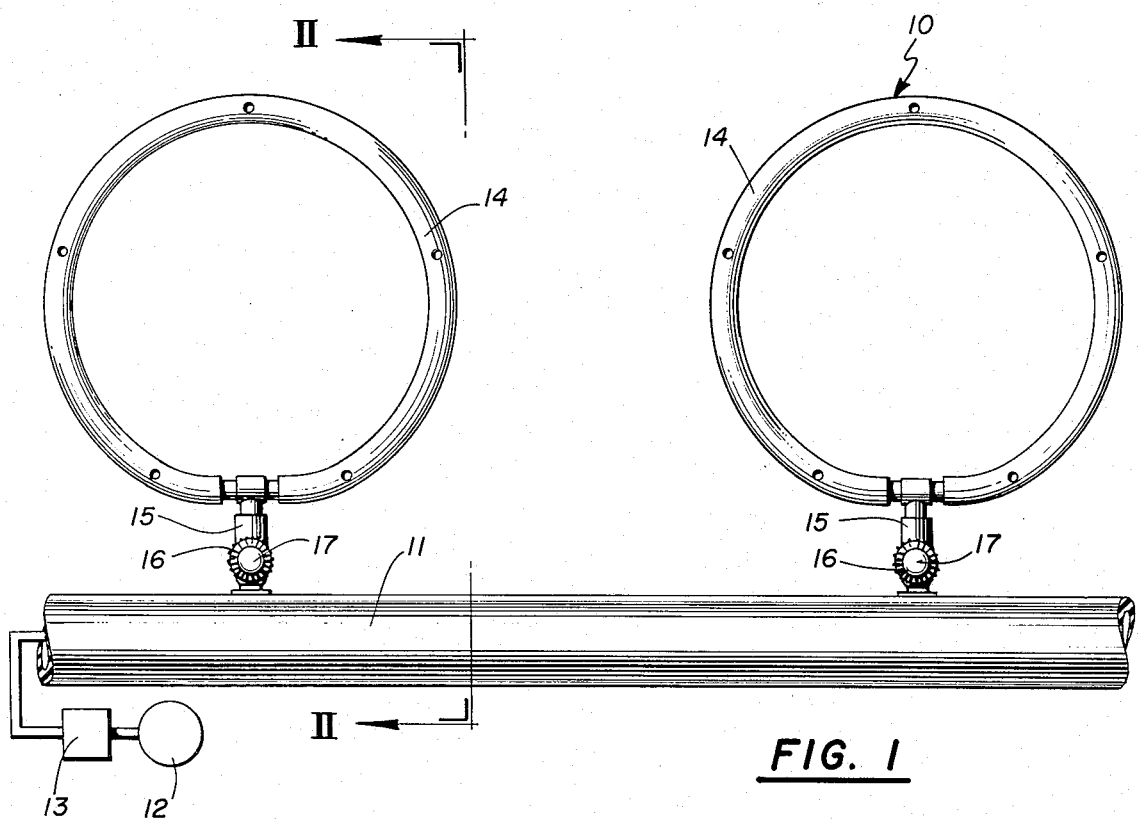
FIG. 1 is a plan view of a plant feeder embodying the principles of the present invention.
Figure 2:
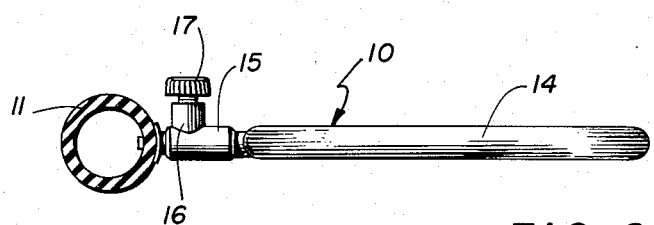
FIG. 2 is a vertical sectional view of the feeder taken on the line II—II of FIG. 1.

Referring first to FIGS. 1 and 2, wherein are best shown the general features of the invention, the plant feeder, indicated generally by the reference numeral 10, is shown as consisting of a main conduit 11, connected to a source 12 of water or nutrient through a pressure reducing valve 13. The main conduit is joined to a tubular annular element 14 by a connector 15. The connector 15 includes as a major element a valve 16, having an adjusting knob 17.

FIGS. 3 and 4 show the details of the apparatus. The annular element 14 is formed as a length of flexible plastic tube formed into an annulus with the ends joined by a smaller tubular fitting. In the preferred embodiment, the plastic used for the tube is polyethylene. The length of plastic tube is joined by the arms of a T-fitting 18 to form the circular shape shown in the drawings. The tube is provided with apertures on one side only and these are fairly small in size. The leg of the T-fitting fits closely into an outlet tube 21 extending from the valve 16. An inlet tube 22 extends from the other side of the valve 16 and is joined to the main conduit 11.

The main conduit 11 is formed of an elastomer material, such as rubber, and in order to connect up the inlet tube 22 it is only necessary to punch a hole in the wall of the main conduit with a sharp instrument and then insert a ferrule or brass bushing 23. The bushing is provided with a radial flange which presses against the surface of the main conduit surrounding the aperture into which the bushing has been pressed. Because of the resilient nature of the material from which the main conduit is made, the bushing stretches the aperture out so that it presses tightly around the bushing. The inlet tube fits snugly in the bushing and because of the long area of contact between the inlet tube and the bushing, the entire assembly is rigidly held together. If sufficient pressure is experienced, due to water pressure in the main conduit, such that the valve and its inlet tube tend to move out of the bushing, it is a simple matter to wrap a small piece of wire around the valve and the main conduit to hold them tightly together.

As is evident in FIG. 4, the valve 16 is a needle valve with a threaded element 24 for regulating the flow of fluid through the valve from the inlet tube 22 to the outlet tube 21. The knob 17 is mounted at the top of the threaded element 24 and is serrated for ease of use. All of the elements are formed from corrosion-resistant materials. As has been stated, the annular element 14 is formed of polyethylene, the T-fitting is formed of polyvinyl chloride, the valve 16 including its threaded element 24, is formed of polyvinyl chloride, the ferrule or bushing 23 is formed of brass, and the main conduit is formed of rubber. All of these materials withstand the onslaught of weather very nicely and, even in the event of freezing, they have sufficient elastomer quality to stretch and not break.

The operation of the apparatus will now be readily understood in view of the above description. The fluid arrives at the main conduit 11 from the source 12 by way of the pressure-reducing valve 13, which reduces its pressure (in the preferred embodiment) to 15 psi. The fluid fills the main conduit and leads into the branch elements through the connectors 15 and then into the annular elements 14. The fluid leaves the annular elements through the apertures 19 and, because of the small size of the apertures, leaves rather slowly. The flow might, in fact, be better described as a "drip". Because of the availability of the valve 16, it is possible to reduce the flow out of the apertures to a rather small amount, thus permitting continuous flow from the apertures 24 hours a day. As is well known, the hours of darkness are best for wetting plants, since the fluid flows directly into the soil and down to the root system, rather than evaporating into the air, as is true when sunlight is present. In order to set up the system, the operator lays the main conduit on the ground in a path that extends past a large number of plants. Where the main conduit passes close to a plant, the operator forms an aperture in the main conduit with a sharp instrument and inserts a brass ferrule. Into that ferrule he inserts the inlet tube 22 of the valve 16 and to the outlet tube of the valve he connects a T-fitting 18. The length of plastic tubing, which eventually forms the annular element 14, is passed around the plant and the ends are then telescoped over the arms of the T-fitting. The elements may be assembled permanently by use of a small amount of cement or glue which is compatible with the plastic materials used. The element 14 is inserted on the T-fitting in such a way that the apertures 19 face downwardly, that is to say, directly toward the earth, so that the fluid flows directly into the root system of the plant. In this case, when adjusted for drip, the holes can be either facing up or down. If the holes are facing upward, then when the system is shut down, the water left in the ring does not leak out and will not be replaced with air. If holes are facing upward when the system is shut down, the drip stops almost immediately, of course, depending on the curvature of the ground and where the feeder on the line is in relation to the others on the same line. If the user wants to put the holes on the top or change them from where they are pointing, all that has to be done is to open the ring and rotate the ring and the T-fitting all at the same time before reassembling the ring. The T-fitting rotates within the valve very easily. The annular element can also be preformed by heating, bending, and then chilling. No cement is then necessary to hold it onto the arms of the fitting.

The advantages of the present invention will now be readily evident. First of all, the elements are formed of weather-resistant materials and are so simply constructed as to have a very long life of useful service with a minimum of maintenance. They are inexpensively made so that the entire assembly can be quite inexpensive and the replacement of parts does not involve any great cost. Because of the novel method of joining the elements to the main conduit, it is possible to place a ring around a plant at any selected position desired.

Figure 5:
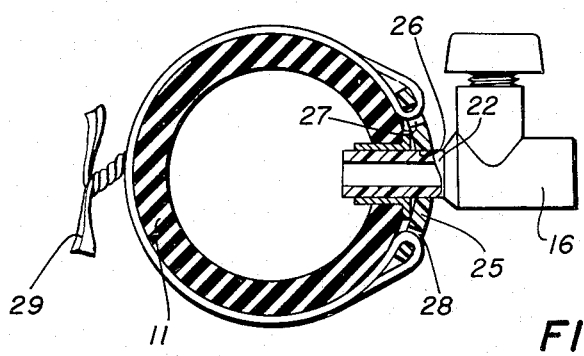
FIG. 5 is a vertical sectional view of a modified form of the feeder.

In FIG. 5 it can be seen that the valve 16 is prevented from slipping from the aperture in the main conduit 11 by using a semi-rigid washer 25 over the inlet tube 22. The washer is provided with a central passage 26 through which the inlet tube passes. It is also provided with two additional apertures 27 and 28 through which a plastic string 29 can be passed. The string is wrapped around the main conduit and tied in place. When the string is tightened, the washer is bent around the curvature of the conduit and this causes the inner edge of the passage 22 of the washer to clamp tightly on the inlet tube to lock it in place.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A plant feeder system for drip feeding a plurality of plants, comprising:
   a. an elongated main conduit adapted to lie alongside the plants,
   b. a plurality of tubular annular element having small apertures formed therein, each element being adapted to lie around an individual plant,
   c. a connection joining the bight of the main conduit to each element, the connection having a stem formed of a rigid polymeric material and the main conduit being formed of a relatively resilient polymeric material, so that the insertion of the stem of the connector into an aperture in the main conduit causes the material around the aperture to grasp the stem in water-tight relationship.

2. A plant feeder as recited in claim 1, wherein the annular element is formed as a length of flexible plastic tube formed into an annulus with the ends joined by a smaller tube.

3. A plant feeder as recited in claim 1, wherein the annular element has the apertures located to face in one direction only away from the general plane of the annulus.

4. A plant feeder as recited in claim 1, wherein the connector includes a valve, the valve having an inlet tube residing in an aperture in the main conduit.

5. A plant feeder as recited in claim 4, wherein the valve has a tubular outlet tube, wherein the outlet tube is fitted to a T-fitting, and wherein the arms of the T-fitting reside in the ends of a plastic tube forming the annular element.

6. A plant feeder as recited in claim 5, wherein the aperture in the main conduit receives a metal ferrule which has a radially-extending flange resting against the outer-surface of the main conduit surrounding the aperture.

7. A plant feeder as recited in claim 6, wherein the valve is provided with a threaded member which is capable of opening and closing the valve.

8. A plant feeder as recited in claim 7, wherein the valve, the T-fitting, and the annular element are all formed of plastic and can be easily assembled and joined in a water-tight condition by use of an adhesive.

* * * * *